No. 664,107. Patented Dec. 18, 1900.
C. H. STOELTING.
LOCK FOR BINDERS.
(Application filed Mar. 31, 1900.)
(No Model.) 3 Sheets—Sheet 1.
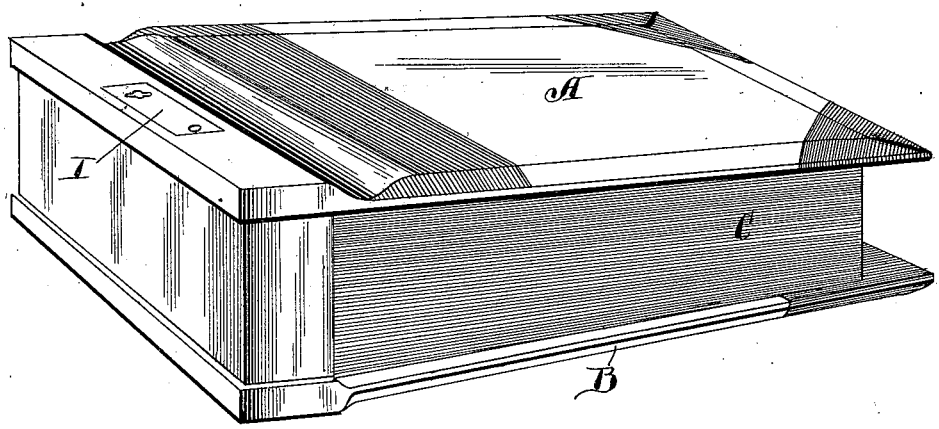
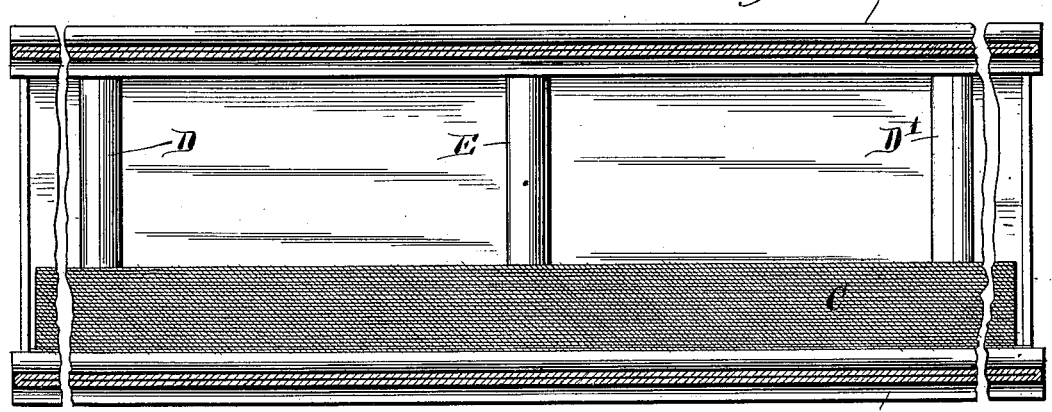
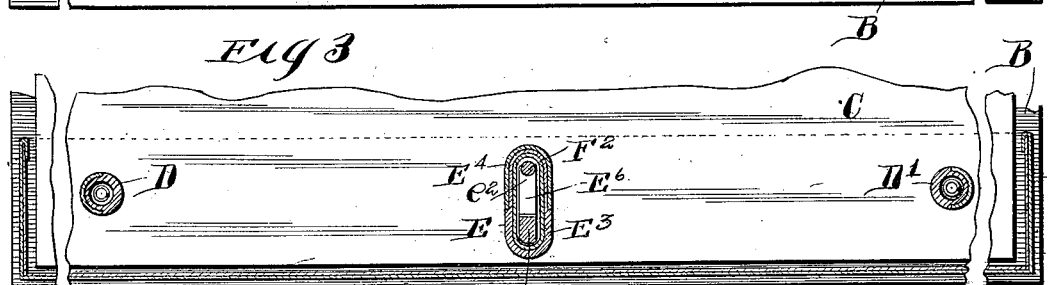
Witnesses:
Carl H. Crawford
C. W. Hills
Inventor:
Christian H. Stoelting
by Poole & Brown
his Attorneys

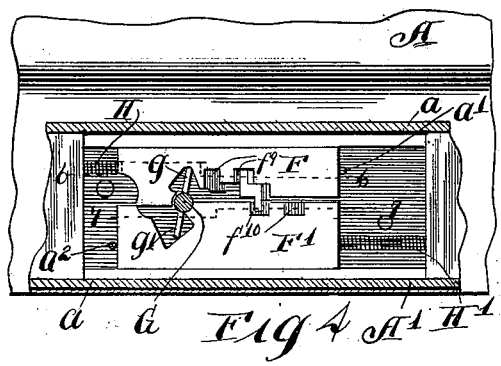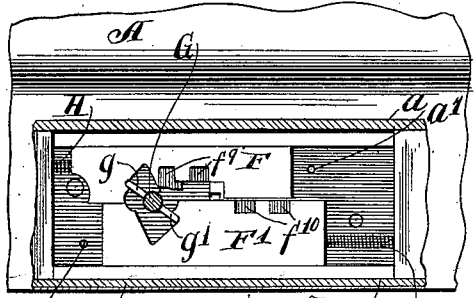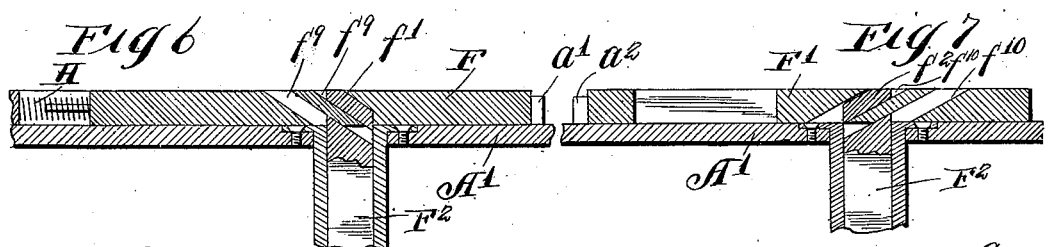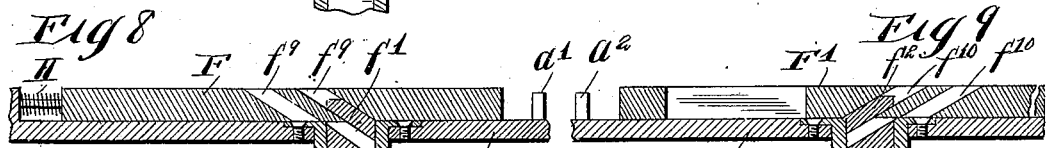

No. 664,107. Patented Dec. 18, 1900.
C. H. STOELTING.
LOCK FOR BINDERS.
(Application filed Mar. 31, 1900.)
(No Model.) 3 Sheets—Sheet 3.
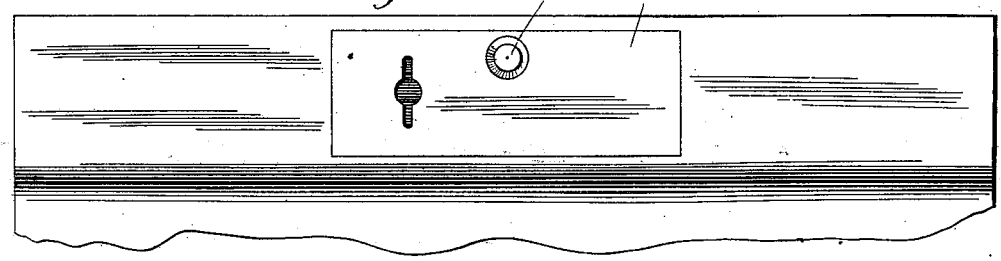
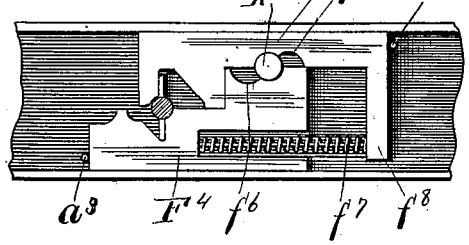
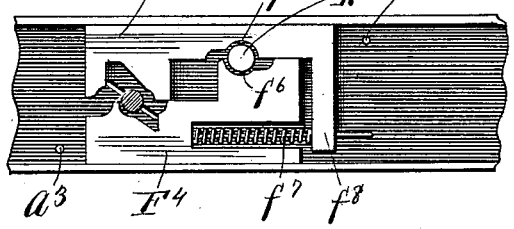
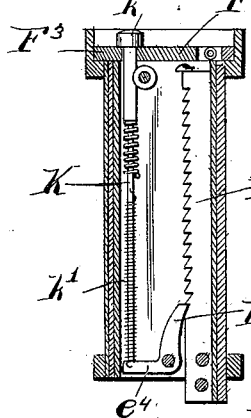
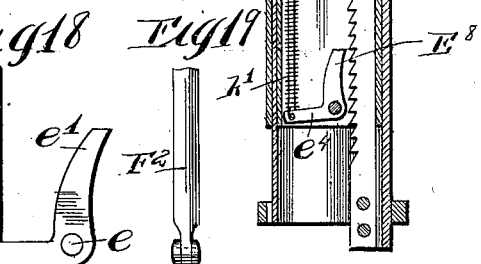
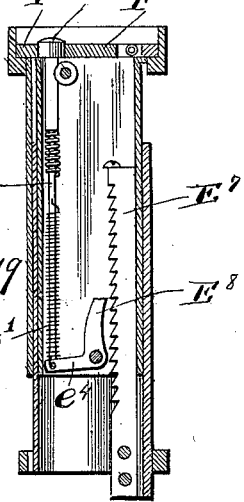
Witnesses:
Carl H. Crawford
C. W. Hills
Inventor:
Christian H. Stoelting
by Pooler Brown
his Attorneys

UNITED STATES PATENT OFFICE.

CHRISTIAN H. STOELTING, OF CHICAGO, ILLINOIS, ASSIGNOR TO WILLIAM A. VAWTER, OF SAME PLACE.

LOCK FOR BINDERS.

SPECIFICATION forming part of Letters Patent No. 664,107, dated December 18, 1900.

Application filed March 31, 1900. Serial No. 10,906. (No model.)

*To all whom it may concern:*

Be it known that I, CHRISTIAN H. STOELTING, of Chicago, in the county of Cook and State of Illinois, have invented certain new and useful Improvements in Locks for Binders; and I do hereby declare that the following is a full, clear, and exact description thereof, reference being had to the accompanying drawings, and to the letters of reference marked thereon, which form a part of this specification.

This invention relates to improvements in that class of devices known as "loose-leaf binders," comprising two lids or covers detachably locked together at one edge thereof and between which are adapted to be temporarily secured a plurality of sheets of paper by means of impaling pins or posts attached to the covers near their locking edges, said posts being adapted to pass through suitable bearing-apertures in the adjacent edges of the sheet.

The invention relates more especially to the improved means for locking the covers together and contemplates a device in which the locking mechanism acts automatically to hold the parts in locked relation at all times except when a key is inserted and turned in the lock and which will immediately lock when the key is removed therefrom.

The invention consists in the matters hereinafter set forth, and more fully pointed out and defined in the appended claims.

In the drawings, Figure 1 is a perspective view of a loose-leaf ledger embodying my invention. Fig. 2 is a rear view of the same, partly in section, showing the back removed. Fig. 3 is a horizontal section through the back of said binder. Fig. 4 is a horizontal section through the lock mechanism, showing the position the wards assume when the device is locked. Fig. 5 is a similar view showing the position of the wards when the binder is unlocked. Fig. 6 is an enlarged section on line 6 6 of Fig. 4. Fig. 7 is a section taken on line 7 7 of Fig. 4. Figs. 8 and 9 are sections similar to Figs. 6 and 7, but showing the bolt or plunger depressed. Fig. 10 is a vertical longitudinal section of the locking-posts. Fig. 11 is a perspective view of one of the parts of the locking mechanism. Fig. 12 is a perspective view of the upper end of the locking-bolt. Figs. 13, 14, 15, 16, and 17 are views of a modification of my invention, of which Fig. 13 is a top plan view of the plate. Fig. 14 is a plan view of the lock with said plate removed, showing the position the wards assume and the parts in locked relation. Fig. 15 is a similar view showing the position the wards assume when the same are in unlocked relation. Fig. 16 is a vertical longitudinal section of the locked post, showing the position the parts assume when the parts of the binder are locked together. Fig. 17 is a similar sectional view showing the position the parts assume when in unlocked relation. Fig. 18 is a side elevation of a modification of my invention. Fig. 19 is an end elevation of the same.

As shown in the drawings, A and B indicate, respectively, the upper and lower lids or covers of the binder, adapted to receive between the same a plurality of sheets of paper C, said sheets being secured between said covers by means of clamping-bars A' B', to which said covers are secured. Said clamping-bars are provided with impaling-posts D D'. Said impaling-posts, as shown, are made of two parts or sections, the outer ends thereof being attached to the clamping-bars A' B', respectively, and the inner ends being adapted to have sliding engagement with each other. E indicates a locking-post, also made up of two parts or sections rigidly attached at their outer ends to the said clamping-bars A' B' and having sliding engagement at their inner ends, like the impaling-posts above mentioned, one of said sections being provided with a ratchet-bar $E^5$, extending longitudinally thereof and rigidly secured therein, and the other section being provided with a pawl $E^6$, adapted to engage said ratchet-bar. The said pawl and ratchet-bar are so disposed as to permit the said sections of the locking-post to slide inwardly one within the other and to resist outward movement thereof. In other words, said parts interlock in such manner as to resist effort to separate the clamping-bars to which said posts are attached. For the purpose of releasing the said pawl from said ratchet-bar, or, in other words, unlocking the same, to permit the capacity of the binder being increased, a plunger or bolt F² is provided in the post-section in which the pawl is located. Said bolt is actuated by means of key-operated tumblers F F', secured in the upper cover and adapted to have sliding engagement on the clamping-bar A' and have operative engagement with the upper end of said bolt F², whereby reciprocating motion is produced in the said bolt, throwing said pawl into and out of engagement with said ratchet-bar. Said covers A and B are hinged at their rear margins to said clamping-bars A' B', respectively, which are concealed in the binding of the rear margins of said cover and comprise binding-plates, between which the sheets of paper are rigidly secured in said binder. The upper one of said binding-plates A' is provided with lateral upwardly-projecting flanges $a\,a$, between which are located the said key-actuated tumblers F F'. The said impaling-posts are secured at their outer ends to said clamping-bars, near the outer ends of the same, and are tubular and adapted to slide one within the other. The said posts serve to hold the said clamping-bars parallel and also serve to retain the leaves in position when the pressure from said clamping-bars is removed therefrom when the binder is unlocked. The post E comprises two tubular post-sections E' E², secured at the middle of the clamping-bars A' B', respectively, by their opposite ends. The said locking-post is herein shown as oblong in cross-section to provide space for the central locking mechanism and is mounted with its longer diameter at right angles to the adjacent clamping-bars. The post-section E², as herein shown, is made of such size as to fit within the tubular interior of the post-section E' and to have telescopic connection therewith. Said locking-post sections are provided with oppositely-arranged half-sleeve sections E³ E⁴, so arranged as to engage each other at their inner edges when the posts are telescoped within each other to form together a complete inclosure for said post-sections, and thereby afford a uniform and continuous bearing for the sheets of paper engaged therewith. As shown in Fig. 10, each sleeve-section covers one edge of the post and engages the opposite sleeve-section on each side of said post midway between said edges. Obviously, however, said sleeve-sections may be otherwise arranged on the post-section, if desired. As the post-section E² is arranged to telescope within the section E', the wall of said section E' must pass, therefore, between the wall of the section E² and the half-sleeve section E⁴. In order to provide space between such sleeve-sections and in the adjacent wall of the post-sections, said sleeve-section is secured to the clamping-bar concentric with said post, but out of contact therewith and at a sufficient distance therefrom to provide a space between the sleeve-section and the post between the same and of the required size. This may be conveniently done by providing a flange on the outer end of said locking-post, said flange having a width equal to the width of the desired space, and by securing said sleeve-section to said flange. Obviously in the case of the other sleeve-section—namely, E³—no such space is required and the said section may be secured to the clamping-bar or soldered or secured by like means to the post-section E'. Said post-section and sleeve-section may be secured by any desired manner to said clamping-bars. As shown, however, the said clamping-bars are each provided with a central aperture complemental in form to the cross-sections of the said locking-posts. The locking-post sections are inserted through the corresponding aperture in the clamping-bar to which the same is to be secured and are secured therein by means of screws or by brazing or soldering, as preferred.

The ratchet-bar F² is secured at its lower end to the lower end of the post-section E' and extends upwardly therein for the entire length thereof. The same is not secured at the top to said post-section, and a space is left between the said ratchet-bar and the wall of the said post-section in which the wall of the post-section E² may be received and slide downwardly to a point near the bottom thereof. The ratchets or teeth on said ratchet-bars incline downwardly and inwardly—that is to say, the same on the under side present horizontal faces and on the upper side thereof upwardly-inclined faces. At the lower end of said inner post-section E² is pivoted the pawl E⁶, by means of a transverse pivot-pin $e$. Said pawl is provided with an upwardly-extending pawl end $e'$, adapted to engage said ratchets of the ratchet-bar, and a horizontally-extending arm $e^2$, extending rearwardly from said pivot to a point adjacent to the side of the post-section. The plunger or bolt F² rests on the said horizontal arm $e^2$ of the said pawl and extends upwardly therefrom through the aperture in said clamping-bar A' and between the tumblers F F', to the upper surface thereof, when said pawl is in engagement with said ratchet-bar. Said bolt F², as shown, is connected with said pawl-arm $e^2$ by means of a spiral pulling-spring $f$, one end of which is secured to said bolt and the other end to said arm $e^2$ and which holds the end of the said bolt constantly in contact with said arm. Obviously, however, the connection between said pawl and said bolt may be made directly, as indicated in Figs. 18 and 19, in which instance the end of said pawl-lever is slotted, and the lower end of the bolt is secured in said slot by means of a transverse pin. The upper end of said bolt is provided on the front and rear sides thereof with laterally-directed lugs $f'\,f^2$. Said lugs are inclined downwardly and oppositely and in the direction of the length of the clamping-plates. As shown, said lugs are formed by providing in the outer end of said bolt F² oppositely and downwardly inclined slots or notches, said notches extending transversely of the greater diameter of said locking-post, and the upper extremity of said bolt is also provided on opposite sides thereof with oppositely and downwardly inclined surfaces parallel with a notch on the said side of said bolt. The said tumblers F F', as shown in Figs. 4, 5, 6, 7, 8, and 9, consist of two flat plates of metal secured side by side on the clamping-bar A', between the flanges $a$ $a$ of the same, and are adapted to have sliding motion longitudinally thereof. Said tumblers are provided in the adjacent sides thereof with complemental oppositely and downwardly inclined grooves or slots $f^9$ $f^{10}$, directed longitudinally of said clamping-bar and complemental to the lugs $f'$ $f^2$ on the head of said bolt and adapted to engage the same, as clearly indicated in Figs. 4, 5, 6, 7, 8, and 9, and so disposed that the lugs on said bolts will be engaged by said notches in said tumblers in a like manner at the same time. The said tumblers are each provided at adjacent ends thereof with oppositely-directed notches adapted to receive the blade of a key G, herein shown to be provided with two wings $g$ $g'$, adapted to engage the said tumblers F F', respectively, at the same time and to actuate the same in opposite directions, as clearly indicated in Figs. 4 and 5. The longitudinal movement of each of said tumblers is limited in one direction by the studs $a'$ $a^2$, secured to said clamping-bars and extending upwardly therefrom in the line of movement with said tumblers. The said tumblers are also provided on the ends thereof opposite said studs $a'$ $a^2$, respectively, with pushing-springs H H', adapted normally to hold said tumblers against said stud when the binder is locked. An outer lock-plate I is provided to cover said tumblers, adapted at all times to confine the same in close contact with the clamping-plate. Said lock-plate is provided with a keyhole corresponding in location to the notches in said tumblers, as shown in Figs. 1, 4, and 5.

The operation of the device is as follows: The binder being locked, the tumblers assume the position indicated in Figs. 4, 6, and 7, with one end of each against the stud $a'$ or $a^2$. The bolt extends upwardly between said tumblers, the lugs $f'$ $f^2$ resting in the corresponding notches in the tumblers F F'. In this position it is observed that the bolt is held at the highest limit of its movement, and the arm $e^2$ of the pawl being elevated the pawl-arm $e'$ is held in contact and in locking relation with the ratchet-bar E⁵. The tumblers are firmly held in their locked position by means of the springs H H'. If, however, it is desired to unlock the binder, the key is turned in the lock, as indicated in Fig. 5, forcing the said tumblers oppositely against the upwardly-inclined surfaces of the lugs $f'$ $f^2$, thereby forcing the said bolt and pawl-lever $e^2$ downwardly in said locking-post, as indicated in Figs. 8 and 9. Obviously a corresponding movement is produced in the pawl-arm, the same being moved inwardly and out of contact with the ratchet. The binder is now unlocked and the clamping-bars may be moved away from each other to any desired extent to permit the insertion or removal of leaves. Obviously the said movement of the tumblers have acted to compress the pushing-springs H H', the same being compressed when the tumblers are actuated by the key. Upon the key being removed, however, the operation of the said pushing-spring is such that it forces the said tumblers backwardly against the studs $a'$ $a^2$, as indicated in Fig. 4, with the effect of again elevating the bolt and throwing the pawl into engagement with the ratchet-bar. In other words, the lock operates automatically as a spring-lock, thereby obviating the possibility of a negligent accountant failing to lock the device after unlocking the same.

For the purpose of preventing the post-sections from being entirely separated a stop J is provided at the upper end of said ratchet-bar, which projects centrally of the tube and which is of sufficient length to engage a part of the pawl, near the bearing thereof.

Obviously my invention may be embodied in several different forms, and another form of the same is illustrated in Figs. 13, 14, 15, 16, and 17. In the said figures the device illustrated is in all respects similar to that heretofore described, with the exception of modified forms of bolt and the tumblers. In this case a plunger K extends downwardly between the tumblers F³ F⁴ into contact with the horizontal pawl end $e^4$ of the pawl E⁸. Said pin is provided on its outer end with a head $k$, which is adapted to rest upon the upper surface of the tumblers F³ F⁴ when the parts are in locked relation. The upper part of said head is designed to project through the lock-plate I'. Said tumblers are provided centrally on their adjacent edges with semicircular notches $f^5$ $f^6$, which are adapted to be brought opposite each other by the action of the key, thereby forming a circular opening through said tumblers beneath the head of the plunger when the parts are in position for the binder to be unlocked. When the binder is locked, said tumblers being moved oppositely, said notches are no longer opposite each other and the head of the said plunger is supported on said tumblers. For the purpose of holding the said tumblers in such position that the binder will be at all times normally locked a spring $f^7$ is provided one end of which bears against the end of the tumbler F⁴, the other end of which bears against an arm $f^8$, extending laterally of the tumbler F³, the action of said spring being to force said tumblers oppositely and move the same in contact with the studs $a^3$ $a^4$, similar in all respects to the studs $a'$ $a^2$ heretofore described. Said tumblers are provided on adjacent edges with key-notches adapted to receive a double-winged key similar to that heretofore described, the action of which is to push the tumblers oppositely until the notches $f^5$ and $f^6$ are opposite each other, as indicated in Fig. 15, in which event the pin K may be passed downwardly, thereby throwing the pawl out of engagement with the ratchet-bar and permitting the said binder to be opened. For the purpose of making the device so self-actuating springs are secured within said locking-post, of which the spring $k'$ is a pulling-spring one end of which is secured on a pin K and the other end thereof being secured to the horizontal arm $e^4$ of the pawl. Obviously in either of the devices described the bolt or pin may be hinged to the horizontal pawl-arm, if preferred, as indicated in Figs. 18 and 19, and the operation will be essentially as described. So, too, a spring may be secured to said pawl to aid in the operation of the same; but the same is not necessary to the operation of the device, and hence are not shown.

I claim as my invention—

1. A locking device for a binder or the like, comprising two telescopic post-sections, one of which is provided interiorly with ratchet-teeth and the other with a pivoted pawl normally in locking engagement with said teeth, of means for actuating said pawl comprising a tumbler transversely movable with respect to said post-sections, and a plunger longitudinally movable within one of the post-sections, one end of the plunger engaging the pawl and the other end adapted for engagement with said tumbler.

2. A binder comprising two clamping-bars and two telescopic post-sections, the latter being attached at their opposite outer ends to said bars and having sliding engagement at their inner ends, one of said sections being provided interiorly with a ratchet-bar extending longitudinally thereof, the other of said sections being provided with a pivoted pawl adapted to engage said ratchet-bar, a plunger or bolt longitudinally movable within one of said post-sections and engaging said pawl at one end, and means for actuating said plunger to disengage said pawl from locking engagement with said ratchet-bar.

3. A binder comprising two clamping-bars and two telescopic post-sections the latter being attached at their opposite outer ends to said bars and having sliding engagement at their inner ends, a ratchet-bar extending longitudinally within one section, a pivoted pawl in the other section adapted for normal engagement with said ratchet-bar and provided with a lever-arm, a plunger or bolt longitudinally movable within one of said sections and engaging said lever-arm, and means for actuating said plunger or bolt to throw said pawl out of engagement with said ratchet-bar.

4. In a binder having two clamping-bars, a locking device comprising two telescopic post-sections attached at their opposite outer ends to said bars and having sliding engagement at their inner ends, one of said sections being provided with a ratchet-bar, a levered pawl in the other of said sections, a plunger or bolt engaging the lever of said pawl and movable longitudinally within one of said post-sections, a tumbler in locking engagement with the outer end of said plunger and transversely movable with respect to said post-section, and means for actuating said tumbler to permit the inward movement of said plunger, whereby said pawl may be thrown out of engagement with the ratchet-bar.

5. A binder having two clamping-bars and a locking device, the latter comprising two telescopic post-sections attached at their opposite outer ends to said bars, one of said sections being provided with a ratchet-bar and the other with a levered pawl in normal engagement with said bar, a plunger in operative engagement with the lever of said pawl, the outer end of which extends beyond the post-section, a tumbler arranged to slide longitudinally on one of said clamping-bars and having locking engagement with said outer end of said plunger, and means for actuating said tumbler and thereby forcing said plunger inwardly or outwardly as desired.

6. A binder having two clamping-bars and a locking device, the latter comprising two telescopic post-sections attached at their opposite outer ends to said bars, one of said sections being provided with a ratchet-bar and the other with a levered pawl normally in engagement with the ratchet-bar, a tumbler having sliding movement longitudinally of said clamping-bar, a spring engaging said tumbler and acting to normally hold the latter from movement, and a longitudinally-movable plunger having engagement at its inner end with said levered pawl and at its outer end with said tumbler.

7. A binder having two clamping-bars and a locking device, the latter comprising two telescopic post-sections attached at their outer ends to said bars and having sliding engagement at their inner ends, one of said sections being provided with a ratchet-bar and the other with a levered pawl adapted to engage said ratchet-bar, a plunger engaging at its inner end the lever of said pawl and having its outer end extending through one of said clamping-bars, a longitudinally-movable tumbler on said clamping-bar engaging the outer end of said plunger, and a pushing-spring secured at one end to said clamping-bar and at its other end engaging said tumbler whereby the latter is held yieldingly against movement.

8. A binder having two clamping-bars and a locking device, the latter comprising two telescopic post-sections attached at their outer ends to said bars, one of said sections being provided with a ratchet-bar and the other with a levered pawl adapted to normally engage said ratchet-bar, a plunger engaging at one of its ends the lever of said pawl and extending at its other end outwardly through one of said clamping-bars, a pair of tumbler-plates adapted to have sliding movement on the outer side of said clamping-bar located on either side of and in engagement with said plunger to hold the latter normally in its retracted position, said engaging means being such as to force said plunger inwardly and thereby disengage the pawl from ratchet-bar when said tumblers are actuated in opposite directions.

9. A binder having clamping-bars and a locking device, the latter comprising two telescopic post-sections attached at their outer ends to said bars and having sliding engagement at their inner ends, a ratchet-bar secured in one of said sections extending longitudinally thereof, a levered pawl secured in the other section, a bolt in operative engagement with the lever of said pawl and extending outwardly through one of said clamping-bars, and a key-actuated tumbler on each side of the extremity of said bolt engaging the same and adapted to slide longitudinally of said clamping-bar, and a spring engaging one end of each tumbler and acting to hold the same normally in their locking position.

10. A binder having two clamping-bars and a locking device, the latter comprising two telescopic sections attached at their outer ends to said bars, one of said sections being provided with a ratchet-bar and the other with a pivoted pawl adapted to normally engage said ratchet-bar, a plunger or bolt in operative engagement with said pawl and extending outwardly through said clamping-bar, a key-actuated two-part tumbler, one part being positioned on the clamping-bar on each side of the head of said plunger, said tumblers being provided on their adjacent edges or sides with downwardly and oppositely inclined grooves, a lug on each side of the head of said plunger complemental to the grooves in said tumblers and adapted to engage the same whereby, when said tumblers are moved in opposite directions, said plunger is forced inwardly thereby disengaging the pawl from the ratchet-bar.

11. A binder having two clamping-bars and a locking device, the latter comprising two telescopic post-sections attached at their outer ends to said bars, one of said sections being provided with a ratchet-bar and the other with a pawl having an integral lever, a plunger or bolt having operative engagement with said lever at one end and provided on its other end with downwardly and oppositely inclined lugs, a tumbler adapted to have sliding engagement with said clamping-bar and provided with grooves complemental to and adapted to be engaged by the lugs on the plunger, a spring or springs engaging said tumbler adapted to hold the same yieldingly in position on the clamping-bar, and a key to actuate said tumbler.

12. A binder having two clamping-bars and a locking device, the latter comprising two telescopic post-sections attached at their outer ends to said bars, one of said sections being provided with a ratchet-bar and the other with a pawl having an integral lever, a plunger or bolt engaging said lever, a pulling-spring one end of which is secured to said lever and the other end to the bolt, downwardly and oppositely inclined lugs on said bolt, a two-part tumbler adapted to have sliding engagement with said clamping-bar and engaging the head of said bolt on opposite sides thereof, said tumbler parts being provided in their adjacent edges or sides with grooves complemental to said lugs and adapted to receive the same whereby said plunger is supported from and actuated by said tumblers, and means for actuating said tumblers.

13. A binder having two clamping-bars and two telescopic post-sections oblong in cross-section and attached at their opposite outer ends to said clamping-bars, said oblong sections being provided exteriorly on their opposite sides with half-sleeve sections which together form a complete sleeve inclosing said first-mentioned sections when the latter are closed, and a locking device comprising a ratchet-bar secured at one end and extending lengthwise in one post-section with a space between the back of said ratchet-bar and the inside of the post-section to which it is attached, and a pivoted locking-pawl secured within the other section normally in engagement with said ratchet-bar, and means for actuating the pawl to disengage it from the ratchet-bar when shifting said posts telescopically.

In testimony that I claim the foregoing as my invention I affix my signature, in presence of two witnesses, this 24th day of March, A. D. 1900.

CHRISTIAN H. STOELTING.

Witnesses:
TAYLOR E. BROWN,
HUGH H. HADLEY.